(12) United States Patent
Velusamy et al.

(10) Patent No.: US 9,356,911 B1
(45) Date of Patent: May 31, 2016

(54) SERVING GATEWAY POLICY ENFORCEMENT

(71) Applicant: Sprint Communications Company L.P., Overland Park, KS (US)

(72) Inventors: Saravana Velusamy, Olathe, KS (US); Rajil Malhotra, Olathe, KS (US); Asfaw Negeri, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/508,236

(22) Filed: Oct. 7, 2014

(51) Int. Cl.
*H04L 29/06* (2006.01)
*H04W 12/08* (2009.01)
*H04W 88/16* (2009.01)

(52) U.S. Cl.
CPC ........... *H04L 63/0281* (2013.01); *H04W 12/08* (2013.01); *H04W 88/16* (2013.01)

(58) Field of Classification Search
CPC ... H04L 63/0281; H04W 12/08; H04W 88/16
USPC .................................................. 726/1, 2, 12
See application file for complete search history.

(56) References Cited

U.S. PATENT DOCUMENTS

| | | | | |
|---|---|---|---|---|
| 8,363,664 B2* | 1/2013 | Ramankutty | ......... | H04W 88/16 370/328 |
| 8,681,739 B1* | 3/2014 | Zhao | ..................... | H04W 8/085 370/328 |
| 2009/0129342 A1* | 5/2009 | Hwang | ............. | H04W 36/0022 370/331 |
| 2009/0207812 A1* | 8/2009 | Gupta | ............... | H04W 36/0094 370/332 |
| 2009/0232022 A1* | 9/2009 | Savolainen | ............... | B07B 1/42 370/254 |
| 2009/0270099 A1* | 10/2009 | Gallagher | ............... | H04W 8/08 455/435.1 |
| 2009/0318147 A1* | 12/2009 | Zhang | ..................... | H04W 8/26 455/435.1 |
| 2010/0088400 A1* | 4/2010 | Andreasen | ............. | H04W 8/26 709/223 |
| 2010/0220662 A1* | 9/2010 | Di | ....................... | H04W 76/062 370/328 |
| 2010/0278113 A1* | 11/2010 | Di | ....................... | H04M 15/66 370/328 |
| 2011/0075675 A1* | 3/2011 | Koodli | .................... | H04L 12/14 370/401 |
| 2011/0103348 A1* | 5/2011 | Hori | .................. | H04W 36/0055 370/331 |
| 2011/0111767 A1* | 5/2011 | Livanos | ................. | H04W 28/16 455/452.2 |
| 2011/0138066 A1* | 6/2011 | Kopplin | .................. | H04L 47/10 709/228 |
| 2011/0176505 A1* | 7/2011 | Hu | ........................ | H04W 48/02 370/329 |
| 2011/0194535 A1* | 8/2011 | Johansson | ............. | H04W 28/24 370/331 |
| 2011/0199903 A1* | 8/2011 | Cuervo | ................. | H04M 15/00 370/235 |
| 2011/0256872 A1* | 10/2011 | Xu | ........................ | H04W 36/08 455/436 |
| 2011/0317560 A1* | 12/2011 | Aramoto | ............... | H04W 36/28 370/235 |
| 2012/0002594 A1* | 1/2012 | Racz | .................. | H04B 7/15557 370/315 |
| 2012/0039175 A1* | 2/2012 | Sridhar | ................. | H04L 47/125 370/236 |
| 2012/0039213 A1* | 2/2012 | Cheng | ................. | H04W 76/022 370/254 |
| 2012/0039323 A1* | 2/2012 | Hirano | ............... | H04W 36/385 370/338 |
| 2012/0046058 A1* | 2/2012 | Vesterinen | ............ | H04W 8/082 455/509 |
| 2012/0109800 A1* | 5/2012 | Zhou | ........................ | G06Q 30/04 705/34 |
| 2012/0196566 A1* | 8/2012 | Lee | ........................ | H04M 15/80 455/408 |
| 2012/0300638 A1* | 11/2012 | Zhou | ..................... | H04W 8/082 370/236 |
| 2012/0307687 A1* | 12/2012 | Zhang | .................... | H04W 4/22 370/259 |

(Continued)

*Primary Examiner* — David García Cervetti

(57) ABSTRACT

Examples disclosed herein provide systems, methods, and software for managing service modification requests in a serving gateway. In one example, a method of operating a serving gateway includes identifying an incoming service modification from a packet data network gateway and determining whether the incoming service modification is permitted based on policy data. The method further includes, if the incoming service modification is permitted, allowing the incoming service modification to proceed across the Long-Term Evolution network. The method also provides, if the incoming service modification is not permitted, altering the incoming the incoming service modification based on the policy data.

18 Claims, 7 Drawing Sheets

(56) References Cited

U.S. PATENT DOCUMENTS

| | | | |
|---|---|---|---|
| 2012/0327893 A1* | 12/2012 | Yuan | H04W 24/10 370/329 |
| 2013/0183995 A1* | 7/2013 | Smith | H04W 72/08 455/452.2 |
| 2013/0279335 A1* | 10/2013 | Ahmadi | H04W 28/0205 370/235 |
| 2014/0056224 A1* | 2/2014 | Rubin | H04W 28/021 370/328 |
| 2014/0106709 A1* | 4/2014 | Palamara | H04W 8/18 455/411 |
| 2014/0153402 A1* | 6/2014 | Rubin | H04J 11/005 370/238 |
| 2014/0153504 A1* | 6/2014 | Wang | H04W 28/14 370/329 |
| 2014/0153544 A1* | 6/2014 | Lu | H04W 8/26 370/331 |
| 2014/0160994 A1* | 6/2014 | Garcia Martin | H04W 48/16 370/259 |
| 2014/0185516 A1* | 7/2014 | Rubin | H04W 16/26 370/315 |
| 2014/0189760 A1* | 7/2014 | Payette | H04N 21/2381 725/86 |
| 2014/0189790 A1* | 7/2014 | Mindler | H04L 67/02 726/3 |
| 2014/0189838 A1* | 7/2014 | Zhao | H04W 12/06 726/7 |
| 2014/0204754 A1* | 7/2014 | Jeong | H04W 28/0231 370/235 |
| 2014/0254356 A1* | 9/2014 | Jeong | H04L 47/20 370/229 |
| 2014/0293796 A1* | 10/2014 | Jeong | H04M 15/66 370/236 |
| 2014/0335881 A1* | 11/2014 | Rubin | H04W 28/20 455/452.1 |
| 2014/0341039 A1* | 11/2014 | Rubin | H04W 28/0231 370/235 |
| 2014/0373124 A1* | 12/2014 | Rubin | H04L 67/28 726/7 |
| 2015/0003246 A1* | 1/2015 | Chandramouli | H04W 28/0289 370/235 |
| 2015/0133126 A1* | 5/2015 | Liu | H04W 36/0072 455/437 |
| 2015/0173106 A1* | 6/2015 | Newberg | H04W 76/066 455/416 |
| 2015/0181364 A1* | 6/2015 | Chen | H04W 4/001 455/418 |
| 2015/0215768 A1* | 7/2015 | Dong | H04W 8/06 370/328 |
| 2015/0365273 A1* | 12/2015 | Cabrera | H04L 41/08 370/254 |

* cited by examiner

US 9,356,911 B1

SERVING GATEWAY POLICY ENFORCEMENT

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some communication systems, gateways, such as packet data network gateways (PGWs) and serving gateways (SGWs), are used to manage the communications as they are delivered across the wireless network. For example, a PGW acts as the interface between the Long-Term Evolution (LTE) network and other packet data networks, such as the Internet or other session initiation protocol networks, whereas the SGW routes data packets between one or more eNodeBs and the PGW.

Because a plurality of different end user devices may connect to the SGWs and PGWs at any given time, quality of service determinations may be made for each communication and wireless device. The quality of service determinations may be based on a quality of service associated with the device, a quality of service associated with the type of communication, or any other quality of service determination. To implement the quality of service, a PGW may transfer service configuration information to a SGW, wherein the SGW forwards the modification to the eNodeB, the wireless device, and any other relevant system on the user side of the communication network. In some examples, the service configuration transferred to the SGW may be inappropriate for any number of reasons, however, the SGW may be unable to appropriately monitor and filter the service configurations before providing them to other elements within the LTE network.

Overview

Examples disclosed herein provide systems, methods, and software to manage service modification requests in a serving gateway. In one example, a method of operating a serving gateway includes identifying an incoming service modification from a packet data network gateway and determining whether the incoming service modification is permitted based on policy data. The method further includes, if the incoming service modification is permitted, authorizing the incoming service modification to proceed across the Long-Term Evolution network. The method also provides, if the incoming service modification is not permitted, altering the incoming service modification based on the policy data.

DETAILED DESCRIPTION

Figure 1:
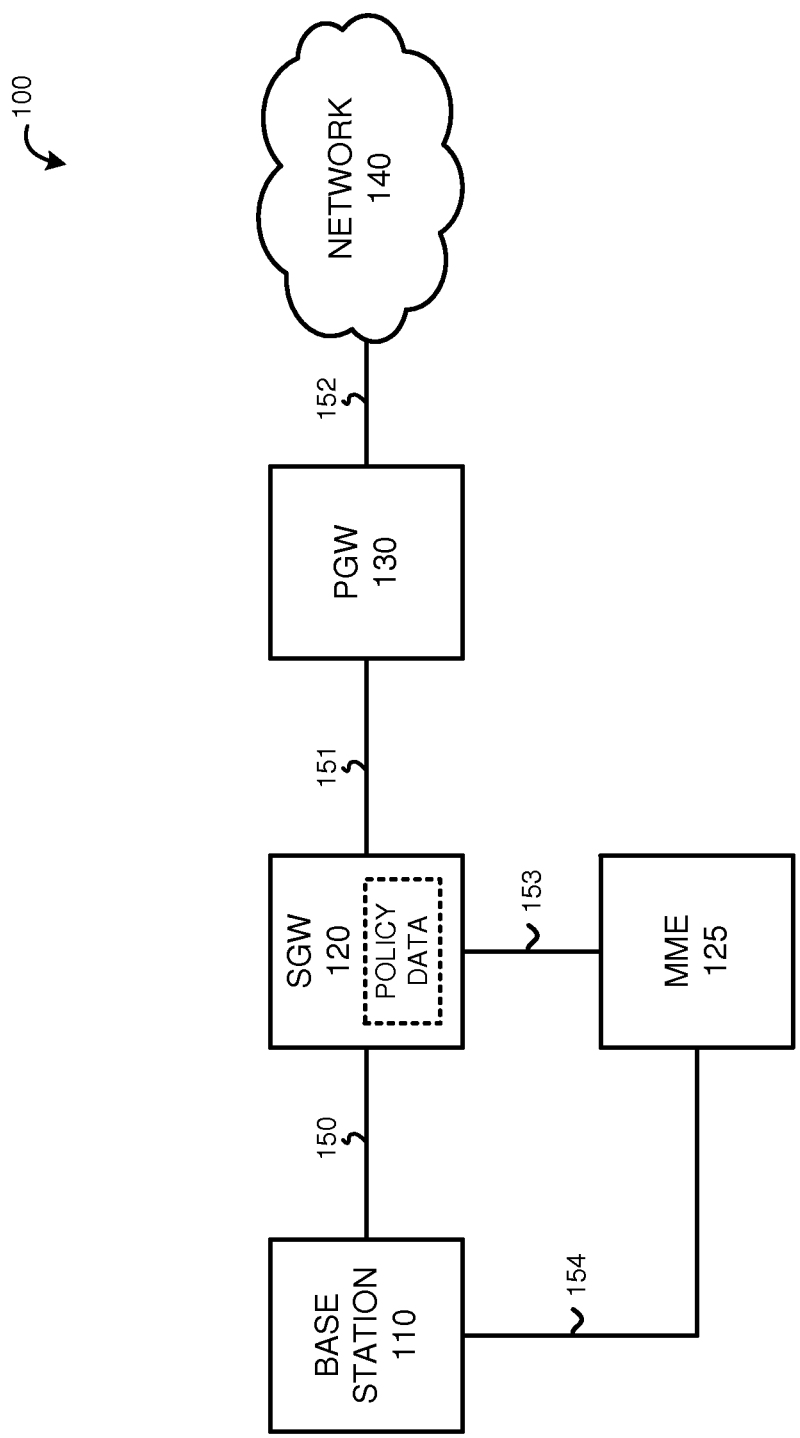
FIG. 1 illustrates a communication system for managing service modifications from a packet data network gateway.

FIG. 1 illustrates a communication system 100 to manage incoming service modifications from a packet data network gateway. Communication system 100 includes base station 110, service gateway (SGW) 120, mobility management entity (MME) 125, packet data network gateway 130 (PGW), and network 140. Base station 110 communicates with SGW 120 and MME 125 over communication links 150 and 154. SGW 120 further communicates with MME 125 and PGW 130 over communication links 153 and 151. PGW communicates with network 140 over communication link 152.

PGW 130 acts as the interface between the Long-Term Evolution (LTE) network and other packet data networks, such as the Internet or other session initiation protocol networks. SGW 120 handles communications from base station 110, sometimes referred to as an eNodeB, and often assists in the initiation and handoff of wireless communication devices (WCDs) between multiple base stations. MME 125 is involved in bearer activation and deactivation procedures and also assists in selecting the appropriate SGW when a WCD attempts to attach to the network.

In operation, a WCD may initiate a communication over base station 110, SGW 120, and PGW 130, to communicate with one or more computing systems in network 140. In response to initiating the communication, PGW 130 may transfer service modifications to SGW 120 to modify bearers or other similar service related aspects for the communication. For example, the service modification may attempt to change the bit rate for the communication, the priority of the communication, or any other similar aspect related to the communication.

Here, SGW 120 includes policy data that is used to determine whether or not a service modification may be made for a particular communication. For example, a communication may be initiated with a first quality of service class identifier (QCI). During the communication, PGW 130 may initiate a modification to the service for a particular device, including a possible modification to the QCI given for the particular communication. Responsive to receiving the modification, SGW 120 will use the policy data to determine whether the modification is allowed. If the request is allowed, the modification may be forwarded to other devices in the LTE network including MME 120, base station 110, and the corresponding WCD. However, if the modification is not approved, the modification may be rejected and prevented from being transferred to MME 120, base station 110, and the corresponding WCD.

Figure 2:
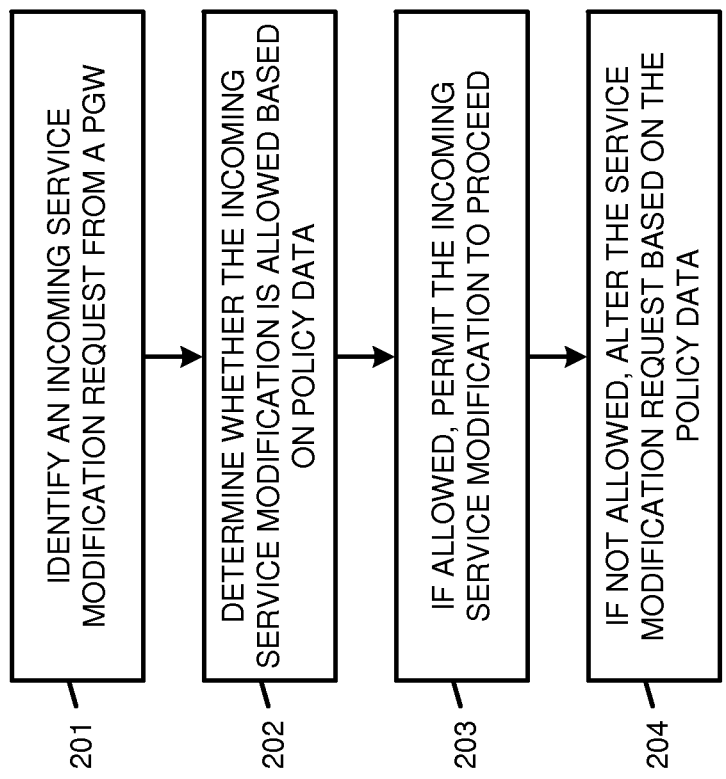
FIG. 2 illustrates a method of operating a serving gateway to manage service modifications from a packet data network gateway.

FIG. 2 illustrates a method of operating a serving gateway to manage service modifications from a packet data network gateway. As depicted, a service modification request is received by the SGW from the PGW (201). Responsive to the request, the SGW determines whether the incoming service modification is allowed based on policy data (202). This determination based on policy data may be based on the identity of the PGW, the identity of the network corresponding to the PGW, the access point name corresponding to the service modification, the QCI corresponding to the service modification, the S5 or S8 interface used between the SGW and PGW, amongst a variety of other policy data. If the incoming service modification is allowed, the SGW will permit or authorize the incoming service modification to proceed in the LTE network (203). In contrast, if the incoming service modification is not allowed, the SGW will alter the service modification request based on the policy data (204). In some examples, this altering of the service modification request may include preventing the modification from being passed to the MME, base station, and WCD corresponding to the modification. In other instances, the SGW may alter the service modification before allowing the service modification to continue to the user side of the LTE network.

Referring to FIG. 1 as an example, PGW 130 may initiate a service modification by transferring the modification to SGW 120. Responsive to the modification, SGW 120 may determine whether the service modification is allowed based on policy data. Once a determination is made, SGW 120 may distribute the modification to base station 110, MME 125, and the corresponding WCD in response to the modification being allowed. In contrast, if the modification were not allowed, SGW 120 may alter the modification based on the policy data. For instance, PGW 130 may represent a gateway that is associated with another wireless service provider. Accordingly, when a service modification is transferred for a particular communication, SGW 120 may block or stop the modification before being transferred further across the LTE network.

Figure 3:
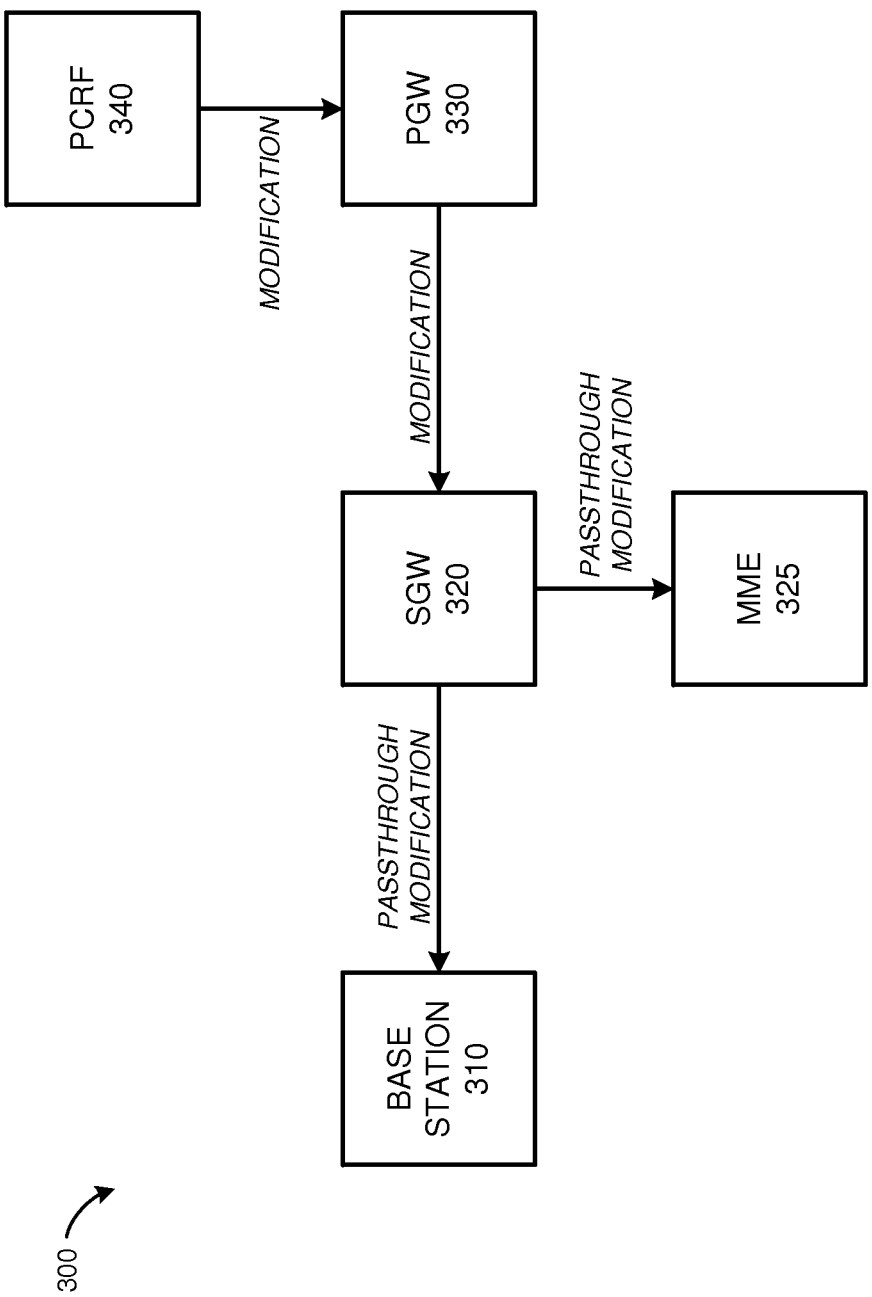
FIG. 3 illustrates an overview of operating a serving gateway to manage service modifications from a packet data network gateway.

FIG. 3 illustrates an overview 300 of operating a serving gateway to manage service modifications from a packet data network gateway. Overview 300 includes base station 310, which may comprise an eNodeB in some examples, SGW 320, MME 325, PGW 330, and policy and charging rules function (PCRF) 340.

In operation, PGW 330 connects SGW 320, base station 310, and one or more WCDs to the internet or other similar communication networks. During these communications, PCRF 340 is used to designate, in real time, the policy rules for connecting WCDs over PGW 330. Although illustrated as external to PGW 330, it should be understood that the processes of PCRF 340 might be implemented wholly or partially within PGW 330.

As WCDs communicate over PGW 330, PCRF 340 may initiate a modification to the service that is provided to one or more of the WCDs. This service modification may include increasing the bit rate, decreasing the bit rate, or making any other similar change to the communication between the one or more WCDs and the network. Responsive to the modification from PCRF 340, PGW 330 transfers the modification to SGW 320. Once the modification is received, SGW 320 determines whether the incoming service modification is permitted based on policy data provided to SGW 320. This determination based on policy data may be based on the identity of the PGW, the identity of the network corresponding to the PGW, the access point name corresponding to the service modification, the QCI corresponding to the service modification, the S5 or S8 interface used between the SGW and PGW, amongst a variety of other policy data. Here, based on the policy data, SGW 320 allows the modification to proceed through the wireless network. Accordingly, the service modification may be transferred to base station 310, MME 325, and any WCD related to the service modification.

In at least one example, the service modification transferred from PGW 330 to SGW 320 comprises an Update Bearer Request to modify the way communications for a WCD are handled as they are passed through the LTE network. Accordingly, if SGW 320 approves the update, the update bearer request may be transferred to the necessary systems and devices in the network to allow the modification to the processing of the communication.

Figure 4:
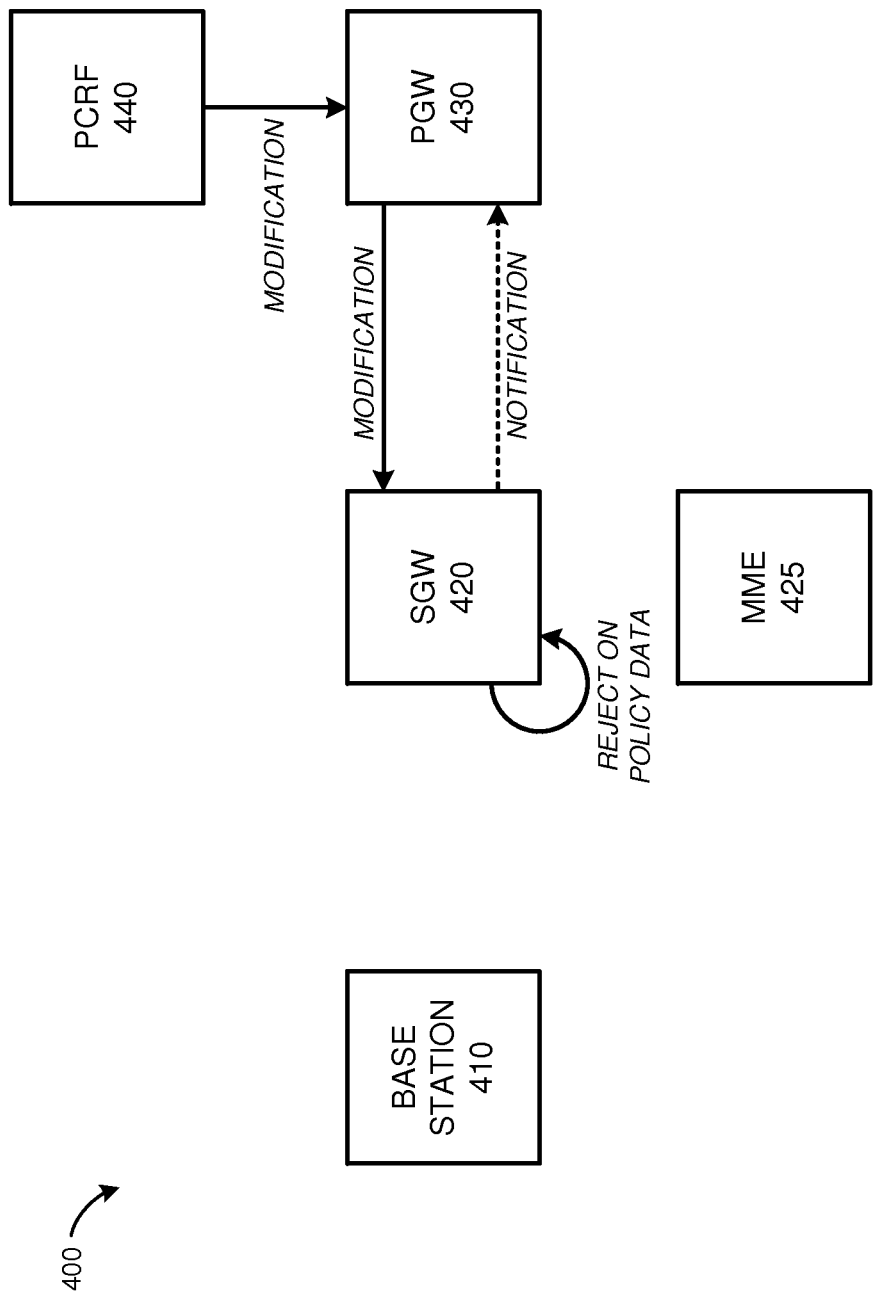
FIG. 4 illustrates an overview of operating a serving gateway to manage service modifications from a packet data network gateway.

FIG. 4 illustrates an overview 400 of operating a serving gateway to manage service modifications from a packet data network gateway. Overview 400 includes base station 410, which may comprise an eNodeB in some examples, SGW 420, MME 425, PGW 430, and PCRF 440.

In operation, PGW 430 connects SGW 420, base station 410, and one or more WCDs to the internet or other similar communication networks. During these communications, PCRF 440 is used to designate, in real time, the policy rules for connecting WCDs over PGW 430. Although illustrated as external to PGW 430, it should be understood that the processes of PCRF 440 might be implemented wholly or partially with PGW 430.

As WCDs communicate over PGW 430, PCRF 440 may initiate a modification to the service that is provided to one or more of the WCDs. This service modification may include increasing the bit rate, decreasing the bit rate, or making any other similar change to the communication between the one or more WCDs and the network. Responsive to the modification from PCRF 440, PGW 430 transfers the modification to SGW 420. Once the modification is received, SGW 420 determines whether the incoming service modification is permitted based on policy data provided to SGW 420. This determination based on policy data may be based on the identity of the PGW, the identity of the network corresponding to the PGW, the access point name corresponding to the service modification, the QCI corresponding to the service modification, the S5 or S8 interface used between the SGW and PGW, amongst a variety of other policy data. Here, responsive to the modification from PGW 430, SGW 420 rejects the modification, preventing the modification from being forwarded to the other devices and systems within the LTE network. In some instances, upon rejecting a modification, SGW 420 may transfer a notification to PGW 430 to give notice to PGW 430 that the modification will not be implemented as requested.

For example, PGW 430 may belong to a separate wireless service provider than SGW 420. Accordingly, when PCRF 440, which also belongs to the separate service provider, initiates the transfer of a service configuration to SGW 420, SGW 420 may reject the modification based on defined policy data. Accordingly, as illustrated in FIG. 4, the service modification may be prohibited from moving forward through the network, and a notification may be returned to PGW 430. In some instances, the notification may include information regarding the rejection of the service modification. Referring to the previous example, SGW 420 may notify PGW 430 that the modification is being rejected because of the network identifier, allowing PGW 430 to make policy changes, if available, to prevent similar modifications from being delivered to SGW 420.

Figure 5:
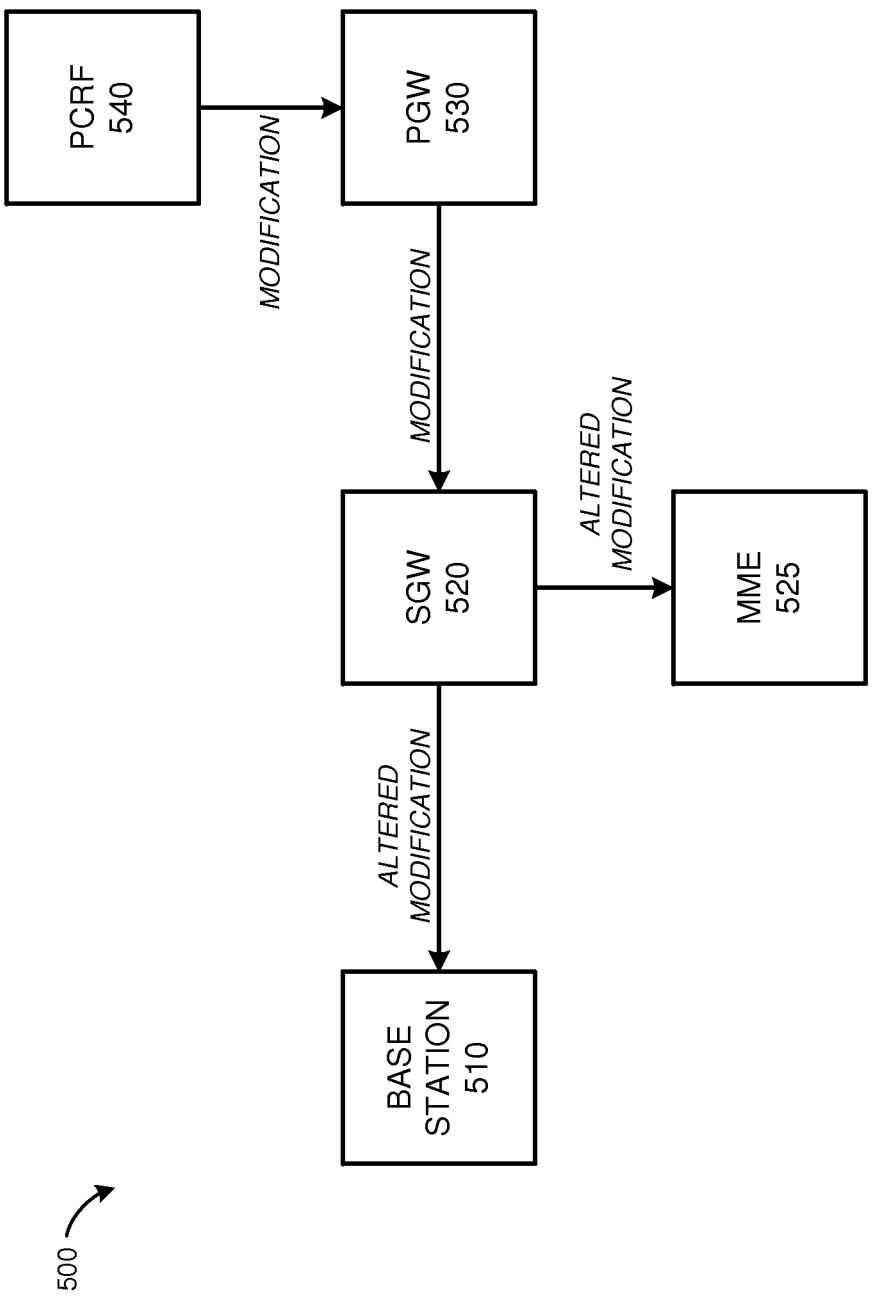
FIG. 5 illustrates an overview of operating a serving gateway to manage service modifications from a packet data network gateway.

FIG. 5 illustrates an overview 500 of operating a serving gateway to manage service modifications from a packet data network gateway. Overview 500 includes base station 510, which may comprise an eNodeB in some examples, SGW 520, MME 525, PGW 530, and PCRF 540.

In operation, PGW 530 connects SGW 520, base station 510, and one or more WCDs to the internet or other similar communication networks. During these communications, PCRF 540 is used to designate, in real time, the policy rules for connecting WCDs over PGW 530. Although illustrated as external to PGW 530, it should be understood that the processes of PCRF 540 might be implemented wholly or partially with PGW 530.

As WCDs communicate over PGW 530, PCRF 540 may initiate a modification to the service that is provided to one or more of the WCDs. This service modification may include increasing the bit rate, decreasing the bit rate, or making any other similar change to the communication between the one or more WCDs and the network. Responsive to the modification from PCRF 540, PGW 530 transfers the modification to SGW 520. Once the modification is received, SGW 520 determines whether the incoming service modification is permitted based on policy data provided to SGW 520. This determination based on policy data may be based on the identity of the PGW, the identity of the network corresponding to the PGW, the access point name corresponding to the service modification, the QCI corresponding to the service modification, the S5 or S8 interface used between the SGW and PGW, amongst a variety of other policy data. Here, responsive to receiving the modification, SGW 520 alters the modification before providing the modification to base station 510, MME 525, and the intended one or more WCDs for the modification. In some examples, this modification may include changing a QCI for the modification, changing a bit rate for the modification, changing the bandwidth for a modification, or any other similar modification. At the same time, SGW 520 may also return a notification to PGW 530 identifying the alteration that was made to the modification. This notification may allow PGW 530 to implement the altered modification as prescribed by SGW 520.

For instance, PCRF 540 or PGW 530 may initiate a modification to a QCI for a particular WCD communication. Responsive to receiving the modification, SGW 520 may identify that the modification is improper based on policy data, and alter the modification to align with the appropriate policy. For example, PGW 530 may initiate a modification to lower the QCI for a particular WCD communication. Responsive to receiving the modification, SGW 520 may alter the QCI of the modification and transfer the altered modification to base station 510, MME 525, and the corresponding WCD. Further, SGW 520 may notify PGW 530 that the QCI has been modified, allowing PGW 530 to maintain the communication path in accordance with the policies supplied by SGW 520.

Figure 6:
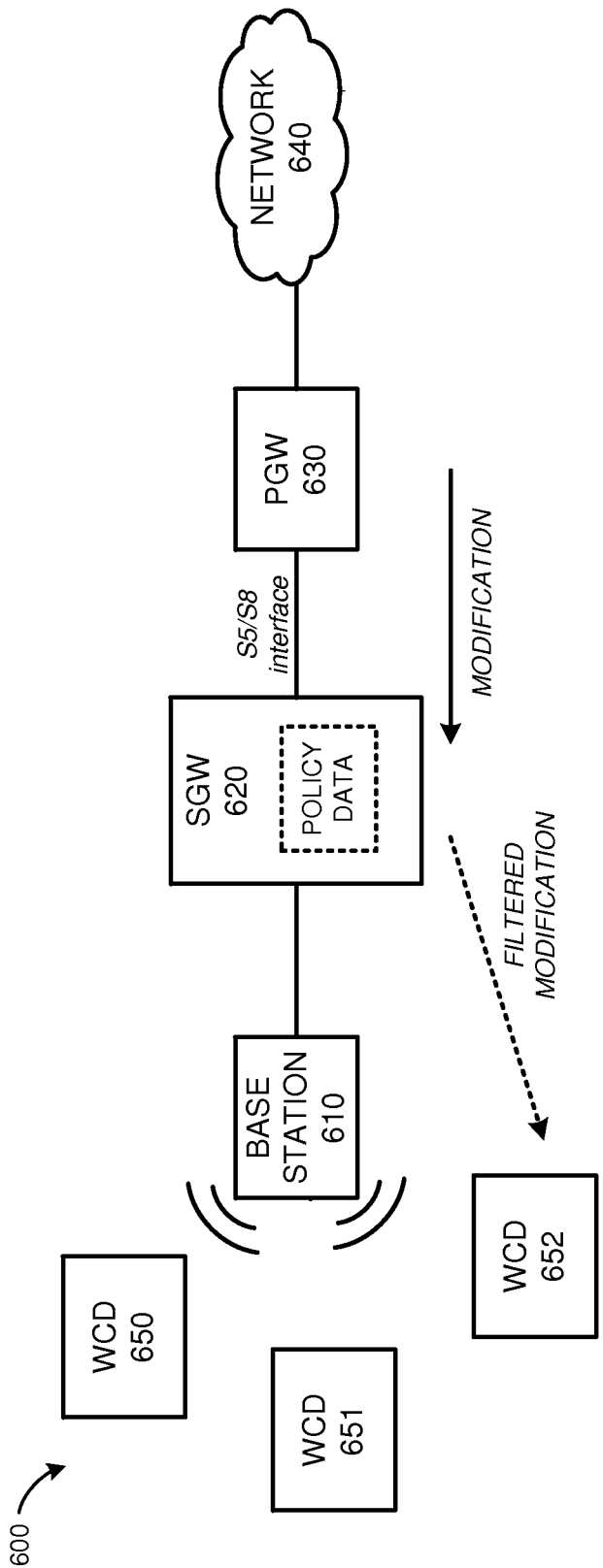
FIG. 6 illustrates a computing environment for transferring service modifications through a Long-Term Evolution network.

FIG. 6 illustrates a computing environment 600 for transferring service modifications through a Long-Term Evolution network. FIG. 6 includes base station 610, which may comprise an eNodeB in some examples, SGW 620, PGW 630, network 640, and WCDs 650-652.

In operation, WCDs 650-652 communicate with one or more devices or systems in network 640 over base station 610, SGW 620, and PGW 630. These communications may be configured with bearer information, QCI information, and APN information, amongst a variety of other information. During the communications, PGW 630, or a PCRF associated with PGW 630, may initiate a service modification directed at one of the communications. Here, PGW 630 transfers a service modification to SGW 620 that corresponds to the communication path for WCD 652. In some examples, this service modification may include an update bearer request to modify the bearer associated with the device. Once SGW 620 receives the modification, SGW 620 applies policy data, which may be defined by an administrator or some other management process, to the modification to determine whether the modification is to be implemented. If the modification is allowed, the modification may be transferred to base station 610, WCD 652, and the associated MME in some instances. If the modification is not allowed, the modification may be stopped by SGW 620 or altered by SGW 620 before the modification is forwarded to the other devices and systems within the LTE network.

In the example where the modification is stopped, this stoppage may be based on a variety of factors including the QCI associated with the modification, the APN associated with the modification, the network in which PGW 630 reside, the S5 or S8 interface associated with the connection between SGW 620 and PGW 630, or any other similar factor, including combinations thereof. Once the modification is stopped, SGW 620 may return a notification to PGW 630 indicating that the modification will not be implemented. This notification may allow PGW 630 to implement communication policies dictated by SGW 620.

In the instance where the modification is altered before being provided to systems and devices in the LTE network, SGW 620 may use the policy data to adjust one or more aspects of the modification before the modification is allowed to proceed to base station 610 and WCD 652. For example, SGW 620 may identify that a QCI modification is being made for a communication associated with WCD 652. Responsive to identifying that this QCI modification is improper, SGW 620 may alter the QCI before it is provided to WCD 652 and base station 610. In some instances, in addition to providing the QCI to other devices within the LTE network, SGW 620 may further provide a notification to PGW 630 indicating that an alteration was made to the modification.

In some examples of computing environment 600, PGW 630 may belong to a separate wireless provider than SGW 620. As a result, SGW 620 may use policy data to manage the service modification requests based on the S8 interface used between the two systems. For instance, SGW 620 may communicate with a plurality of PGWs, each with different permissions for modifying service settings for communications. Accordingly, based on the S8 interface identifier between SGW 620 and PGW 630, SGW 620 may be able to enforce rules regarding a particular service modification.

Figure 7:
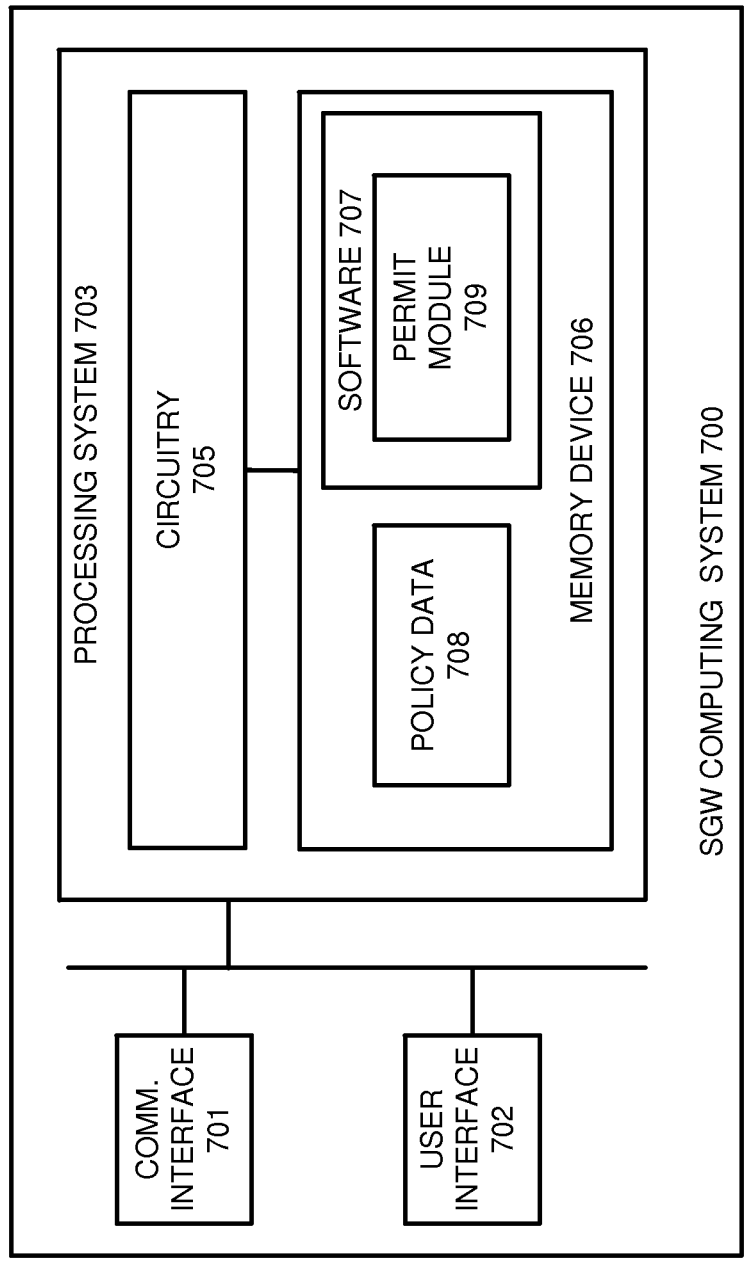
FIG. 7 illustrates a serving gateway computing system to manage service modifications from a packet data network gateway.

FIG. 7 illustrates a SGW computing system 700 to manage service modifications from a PGW. SGW computing system 700 is representative of a computing system that may be employed in any computing apparatus, system, or device, or collections thereof, to suitably implement the SGWs described herein. Computing system 700 comprises communication interface 701, user interface 702, and processing system 703. Processing system 703 is communicatively linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof. In particular, communication interface 701 is configured to communicate with a PGW using a S5 or S8 interface.

Communication interface 701 may further be configured to communicate with one or more MMEs, eNodeBs, other PGWs, or other similar network components.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Operating software 707 comprises computer programs, firmware, or some other form of machine-readable processing instructions. Operating software 707 includes permit module 709, although any number of software modules may provide the same operation. Operating software 707 may further include an operating system, utilities, drivers, network interfaces, applications, or some other type of software. When executed by circuitry 705, operating software 707 directs processing system 703 to operate SGW computing system 700 as described herein.

In particular, SGW computing system 700 may be used as an intermediary between a PGW and one or more wireless base stations providing service to a plurality of wireless devices. While providing service, the PGW may transfer a service modification to the SGW to implement a change in service to one or more of the WCDs. For example, the PGW may attempt to transfer an Update Bearer Request, or any other similar request that could be used to change the quality of service to the WCD. Once the service modification is received, permit module 709 determines whether the incoming service modification is allowed based on policy data 708. Policy data 708 may be used to filter or otherwise modify any modification request transferred by the PGW. This filtering based on policy data may be based on the identity of the PGW, the identity of the network corresponding to the PGW, the access point name corresponding to the service modification, the QCI corresponding to the service modification, the S5 or S8 interface used between the SGW and PGW, amongst a variety of other policy data.

In some examples, when the service modification is allowed, SGW computing system 700 may forward the modification to other elements within the LTE network. Thus, SGW computing system 700 may forward the modification to a MME, a base station, and the corresponding WCD for the modification. Once transferred, and acknowledged by the devices in the network, the WCD may communicate using the service parameters suggested by the PGW.

In contrast, when the service modification is not allowed, SGW computing system 700 may alter the service modification based on the policy data. For example, the PGW may transfer a service modification requesting to transition a particular communication from a first QCI to a second QCI. Once the modification is received, SGW computing system 700 may identify that the transition is not allowed based on policy data 708. Accordingly, instead of forwarding the modification to the other elements within the LTE network, SGW computing system 700 may stop the implementation of the modification. In some instances, in addition to halting the service modification, SGW computing system 700 may transfer a notification to the PGW to inform the PGW that the requested service modification will not be implemented.

Although illustrated above as halting the service modification when the modification is improper, it should be understood that SGW computing system 700 might alter the modification in some examples. Thus, for example, if the modification attempts to modify the QCI for a particular communication, SGW computing system 700 may alter the QCI modification to a permitted modification. Once altered, the modification may be forwarded to the corresponding LTE elements within the network. Further, once the modification is altered, SGW computing system 700 may transfer a notification the PGW to inform the PGW that the original modification had been altered.

In at least one example of handling service modifications, SGW computing system 700 may be in communication with a PGW of another wireless service provider using a S8 interface. During this communication, the other service provider may attempt to make a service modification that is not desirable for the network of SGW computing system 700. Accordingly, rather than permitting the modification to be passed through the user side of the LTE network, SGW computing system 700 may be used to halt the modification before it can be implemented in the network. Additionally, SGW computing system 700 may be used to notify the PGW that future similar modifications will also be halted, resulting in a possible reduction in the number of improper service modification requests. Although this example uses the S8 interface, it should be understood that this is merely a single example. In other instances, similar process may be used to permit or alter service modifications from PGW systems using the S5 interface.

Returning to the elements of FIG. 1, base station 110, SGW 120, MME 125, and PGW 130 may each include communication interfaces, network interfaces, processing systems, computer systems, microprocessors, storage systems, storage media, or some other processing devices or software systems, and can be distributed among multiple devices. In some examples base station 110, SGW 120, and MM 125 may belong to an LTE network of a first wireless service provider, and PGW 130 may belong to a second wireless service provider. Base station 110 may comprise an eNodeB, or any other similar base station capable of providing LTE service to one or more WCDs. These WCDs may include wireless phones, computers, gaming systems, or any other similar wireless communication device.

Network 140 includes network elements that provide communications services to PGW 130 and WCDs communicating over the LTE network. Network 120 may comprise switches, wireless access nodes, Internet routers, network gateways, application servers, computer systems, communication links, or some other type of communication equipment—including combinations thereof.

Communication links 150-154 each use metal, glass, optical, air, space, or some other material as the transport media. Communication links 150-154 may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof. Communication link 150-154 may each be a direct link, or can include intermediate networks, systems, or devices, and can include a logical network link transported over multiple physical links. Communication link 151 may use a S5 or S8 interface to communicate service modification information between PGW 130 and SGW 120.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a serving gateway in a Long-Term Evolution network, the method comprising:
identifying an incoming service modification from a packet data network gateway;
determining whether the incoming service modification is permitted based on policy data;
if the incoming service modification is permitted, authorizing the incoming service modification to proceed across the Long-Term Evolution network; and
if the incoming service modification is not permitted, altering the incoming service modification based on the policy data and transferring a notification to the packet data network gateway indicating an alteration to the incoming service modification,
wherein identifying the incoming service modification from the packet data network gateway comprises identifying an incoming Update Bearer Request from the packet data network gateway.

2. The method of claim 1 wherein authorizing the incoming service modification to proceed across the Long-Term Evolution network comprises transferring the incoming service modification for delivery to a mobility management entity, an eNodeB, and a wireless communication device.

3. The method of claim 1 wherein altering the incoming service modification based on the policy data comprises blocking the incoming service modification based on the policy data.

4. The method of claim 3 wherein transferring the notification to the packet data network gateway indicating the alteration to the incoming service modification comprises transferring the notification to the packet data network gateway indicating the incoming service modification was blocked.

5. The method of claim 1 wherein determining whether the incoming service modification is permitted based on the policy data comprises determining whether the incoming service modification is permitted based on an access point name associated with the incoming service modification.

6. The method of claim 1 wherein determining whether the incoming service modification is permitted based on the policy data comprises determining whether the incoming service modification is permitted based on a S8 interface between the serving gateway and the packet data network gateway.

7. The method of claim 1 wherein determining whether the incoming service modification is permitted based on the policy data comprises determining whether the incoming service modification is permitted based on an identifier for the packet data network gateway.

8. The method of claim 1 wherein determining whether the incoming service modification is permitted based on the policy data comprises determining whether the incoming service modification is permitted based on a quality of service class identifier associated with the incoming service modification.

9. The method of claim 1 wherein determining whether the incoming service modification is permitted based on the policy data comprises determining whether the incoming service modification is permitted based on a tunnel identifier corresponding to the incoming service modification.

10. A computer apparatus to manage service modifications in a Long-Term Evolution network, the computer apparatus comprising:
processing instructions that direct a serving gateway, when executed by the serving gateway, to:
identify an incoming service modification from a packet data network gateway;
determine whether the incoming service modification is permitted based on policy data;
if the incoming service modification is permitted, authorize the incoming service modification to proceed across the Long-Term Evolution network; and
if the incoming service modification is not permitted, alter the service modification based on the policy data and transfer a notification to the packet data network gateway indicating an alteration to the incoming service modification,
wherein the processing instructions to identify the incoming service modification from the packet data network gateway direct the serving gateway to identify an incoming Update Bearer Request from the packet data network gateway; and
one or more non-transitory computer readable media that store the processing instructions.

11. The computer apparatus of claim 10 wherein the processing instructions to authorize the incoming service modification to proceed across the Long-Term Evolution network direct the serving gateway to transfer the incoming service modification for delivery to a mobility management entity, an eNodeB, and a wireless communication device.

12. The computer apparatus of claim 10 wherein the processing instructions to alter the incoming service modification based on the policy data direct the serving gateway to block the incoming service modification based on the policy data.

13. The computer apparatus of claim 12 wherein the processing instructions to transfer the notification to the packet data network gateway indicating the alteration to the incoming service modification direct the serving gateway to transfer the notification to the packet data network gateway indicating the incoming service modification was blocked.

14. The computer apparatus of claim 10 wherein the processing instructions to determine whether the incoming service modification is permitted based on the policy data direct the serving gateway to determine whether the incoming service modification is permitted based on an access point name associated with the incoming service modification.

15. The computer apparatus of claim 10 wherein the processing instructions to determine whether the incoming service modification is permitted based on the policy data direct the serving gateway to determine whether the incoming service modification is permitted based on a S8 interface between the serving gateway and the packet data network gateway.

16. The computer apparatus of claim 10 wherein the processing instructions to determine whether the incoming service modification is permitted based on the policy data direct the serving gateway to determine whether the incoming service modification is permitted based on an identifier for the packet data network gateway.

17. The computer apparatus of claim 10 wherein the processing instructions to determine whether the incoming service modification is permitted based on the policy data direct the serving gateway to determine whether the incoming service modification is permitted based on a quality of service class identifier associated with the incoming service modification.

18. The computer apparatus of claim 10 wherein the processing instructions to determine whether the incoming service modification is permitted based on the policy data direct the serving gateway to determine whether the incoming service modification is permitted based on a tunnel identifier corresponding to the incoming service modification.

\* \* \* \* \*